United States Patent
Wee et al.

(10) Patent No.: US 8,688,438 B2
(45) Date of Patent: Apr. 1, 2014

(54) GENERATING SPEECH AND VOICE FROM EXTRACTED SIGNAL ATTRIBUTES USING A SPEECH-LOCKED LOOP (SLL)

(75) Inventors: Keng Hoong Wee, Singapore (SG); Lorenzo Turicchia, Cambridge, MA (US); Rahul Sarpeshkar, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1040 days.

(21) Appl. No.: 12/702,676

(22) Filed: Feb. 9, 2010

(65) Prior Publication Data

US 2010/0217601 A1    Aug. 26, 2010

Related U.S. Application Data

(63) Continuation of application No. PCT/US2008/073240, filed on Aug. 15, 2008.

(60) Provisional application No. 60/955,896, filed on Aug. 15, 2007.

(51) Int. Cl.
*G10L 19/00* (2013.01)
*G10L 11/06* (2006.01)

(52) U.S. Cl.
USPC ............................ 704/220; 704/214; 704/227

(58) Field of Classification Search
USPC ......... 704/201, 205, 206, 207, 219, 220, 221, 704/208, 214, 226, 227
See application file for complete search history.

(56) References Cited

U.S. PATENT DOCUMENTS

| | | | |
|---|---|---|---|
| 3,631,520 A * | 12/1971 | Atal | 704/219 |
| 4,044,204 A * | 8/1977 | Wolnowsky et al. | 704/208 |
| 4,401,855 A * | 8/1983 | Broderson et al. | 704/219 |
| 4,719,923 A * | 1/1988 | Hartwell et al. | 600/454 |
| 4,797,925 A * | 1/1989 | Lin | 704/223 |
| 4,868,867 A * | 9/1989 | Davidson et al. | 704/200.1 |
| 4,922,539 A * | 5/1990 | Rajasekaran et al. | 704/219 |
| 5,553,194 A * | 9/1996 | Seza et al. | 704/221 |
| 5,822,721 A * | 10/1998 | Johnson et al. | 704/219 |
| 6,003,001 A * | 12/1999 | Maeda | 704/223 |
| 6,035,270 A * | 3/2000 | Hollier et al. | 704/202 |
| 6,161,086 A * | 12/2000 | Mukherjee et al. | 704/207 |
| 6,249,758 B1 * | 6/2001 | Mermelstein | 704/220 |
| 6,751,587 B2 * | 6/2004 | Thyssen et al. | 704/228 |
| 7,162,417 B2 * | 1/2007 | Yamada et al. | 704/214 |
| 7,373,298 B2 * | 5/2008 | Ehara | 704/233 |
| 7,787,640 B2 * | 8/2010 | Turicchia et al. | 381/98 |
| 8,473,283 B2 * | 6/2013 | Master et al. | 704/207 |

OTHER PUBLICATIONS

Sawada et al., "Mechanical Voice System and its Singing Performance" Proceedings of 2004 IEEE/RSJ International Conference on Intelligent Robots and Systems Sep. 28-Oct. 2, 2004, Japan, pp. 1920-1925.

Hecker. "Studies of Nasal Consonants with an Articulatory Speech Synthesizer" The Journal of Acoustical Society of America, vol. 34, No. 2, Feb. 1962, pp. 179-188.

Stevens, "Synthesis of Speech by Electrical Analog Devices" Journal of the Audio Engineering Society, vol. 4, No. 1, Jan. 1956, pp. 2-8.

* cited by examiner

*Primary Examiner* — Martin Lerner
(74) *Attorney, Agent, or Firm* — Gesmer Updegrove LLP

(57) ABSTRACT

A speech processing system includes a plurality of signal analyzers that extract salient signal attributes of an input voice signal. A difference module computes the differences in the salient signal attributes. One or more control modules control a plurality of speech generators using an output signal from the difference module in a speech-locked loop (SLL), the speech generators use the output signal to generate a voice signal.

37 Claims, 23 Drawing Sheets

14

GENERATING SPEECH AND VOICE FROM EXTRACTED SIGNAL ATTRIBUTES USING A SPEECH-LOCKED LOOP (SLL)

PRIORITY INFORMATION

This application is a continuation of PCT Application No. PCT/US2008/073240, filed on Aug. 15, 2008, which claims priority to U.S. Provisional Application Ser. No. 60/955,896, filed on Aug. 15, 2007. Both applications are incorporated herein by reference in their entireties.

BACKGROUND OF THE INVENTION

The invention is related to the field of speech processing, and in particular to a speech processing system utilizing speech production components, speech analysis components, noise generators, and computing differences in signal attributes, and controlling speech production arranged in a feedback configuration.

FIG. 1 is a schematic diagram highlighting the major regions of the vocal tract 2 involved in speech production, namely, nasal cavity, oral cavity, pharynx, larynx, trachea, bronchi and lungs. FIG. 2 shows a detailed cross-section of the speech production system 4 illustrating the three main components namely, the glottis within the larynx, the subglottal system and the supraglottal vocal tract. A structure called the soft palate (velum) separates the oral and nasal cavities. The lungs and respiratory muscles provide the vocal power supply. Voiced speech is produced by air expelled from the lungs causing the vocal folds to vibrate as a relaxation oscillator. The ejected air stream flow in pulses and is modulated by the vocal tract. In unvoiced speech, sounds are created by passing the stream of air through a narrow constriction in the tract. They can also arise by making a complete closure, building up pressure behind it, and then followed by an abrupt release. In the first case, a turbulent flow is produced while in the second case, a brief transient excitation occurs. The puffs of air are shaped into sound waves of speech and eventually, radiated from the lips and/or nose.

The invention provides an approach in modeling speech synthesis techniques with an analog vocal tract.

SUMMARY OF THE INVENTION

According to one aspect of the invention, there is provided a speech processing system. The speech processing system includes a plurality of signal analyzers that extract salient signal attributes of an input voice signal. A difference module computes the differences in the salient signal attributes. One or more control modules control a plurality of speech generators using an output signal from the difference module in a speech-locked loop (SLL), the speech generators use the output signal to generate a voice signal.

According to another aspect of the invention, there is provided a method of performing the operations of a speech processing system. The method includes extracting salient signal attributes of an input voice signal using a plurality of signal analyzers. Also, the method includes computing the differences in the salient signal attributes using a difference module. Moreover, the method includes controlling a plurality of speech generators using an output signal from the difference module in a speech-locked loop (SLL) using one or more control modules. The speech generators use the output signal to generate a voice signal.

According to another aspect of the invention, there is provided a method of developing a speech processing system. The method includes providing a plurality of signal analyzers that extract salient signal attributes of an input voice signal. Also, the method includes implementing a difference module for computing the differences in the salient signal attributes. Furthermore, the method includes implementing one or more control modules for controlling a plurality of speech generators using an output signal from the difference module in a speech-locked loop (SLL), the speech generators use the output signal to generate a voice signal.

According to another aspect of the invention, there is provided a vocal tract system. The vocal tract system includes an electronically adjustable component having an automatic gate terminal control for controlling a plurality of devices using feedback and feedforward techniques so as to allow the electronically adjustable component to behave similarly to a linear and/or nonlinear resistor.

DETAILED DESCRIPTION OF THE INVENTION

Figure 1:
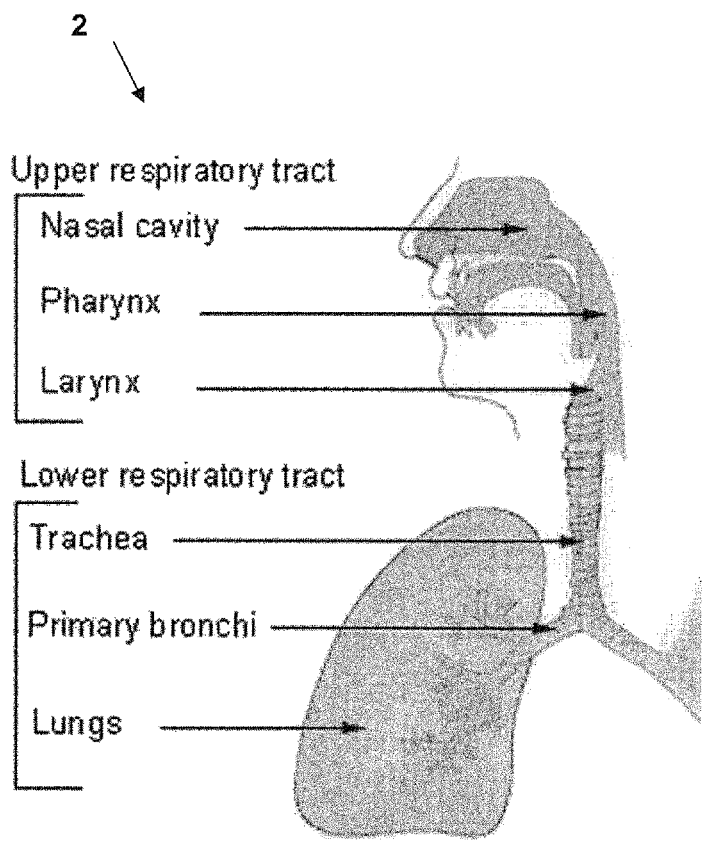
FIG. 1 is a schematic diagram showing the principal components involved in speech production.
Figure 2:
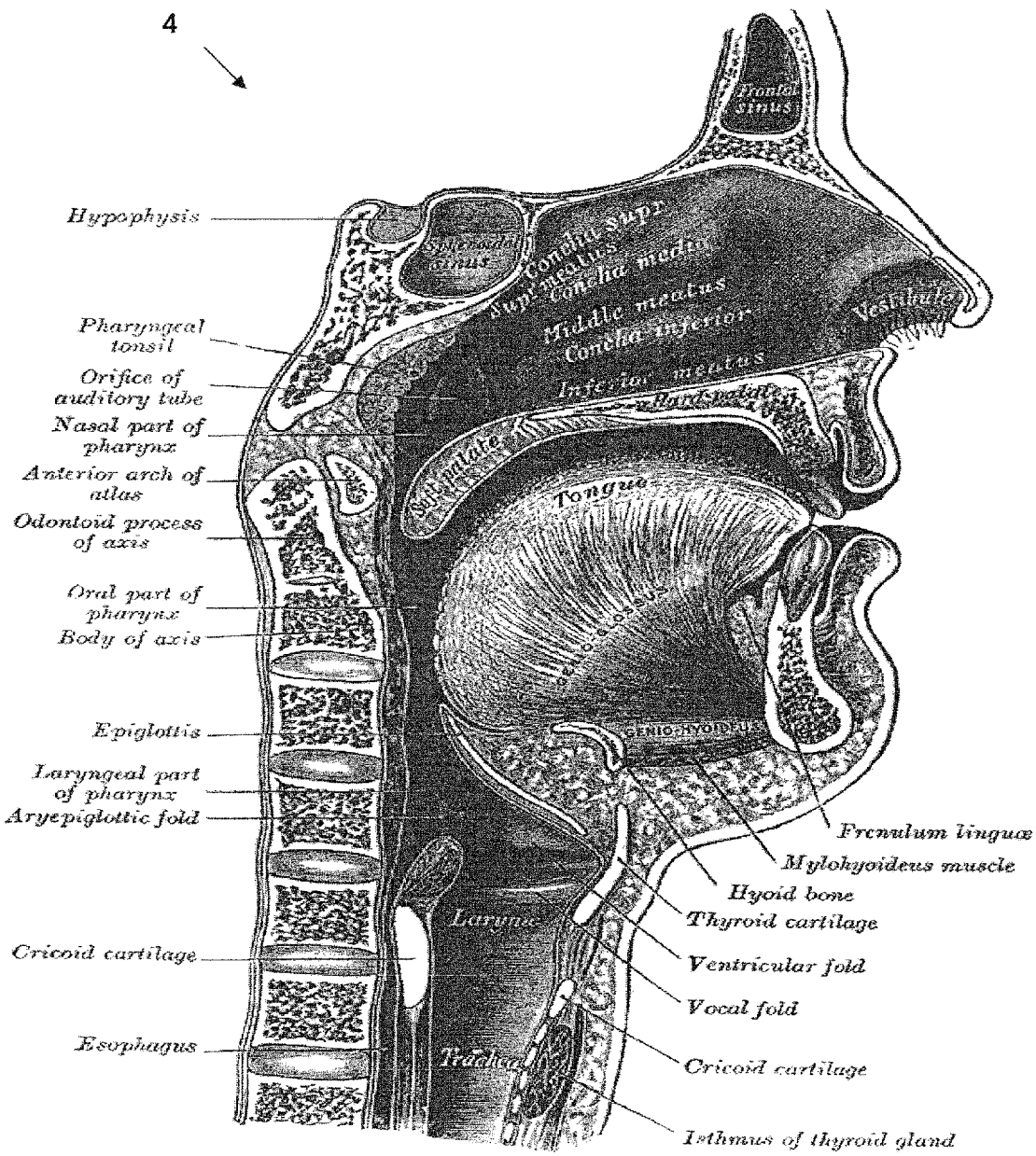
FIG. 2 is a schematic diagram illustrating the cross section of nose mouth, pharynx, and larynx.

The invention relates to a speech processing apparatus utilizing speech production components, speech analysis components, noise generators, means to compute differences in signal attributes, and means to control speech production arranged in a feedback configuration hereinafter known as the speech-locked loop (SLL). Previous attempts to build speech apparatus based on an analysis-by-synthesis method required intensive computation and thus hard to do in real time with low power consumption and hardware complexity.

In particular, the invention employs speech analysis components modeled after the biological cochlea and speech production components modeled after the vocal tract. The speech production component are modeled as an analog electrical transmission line, which allows us to naturally map acoustic elements such as mass, compressibility and viscous damping, to their electrical equivalents corresponding to inductance, capacitance and resistance. Linear and non-linear constriction resistances may be modeled with a transistor circuit. Also, the speech analysis component is modeled with an analog circuit inspired by the human auditory system. An analog VLSI implementation of the speech apparatus has the following advantages—low power consumption and low hardware complexity.

The techniques used for driving the speech production component allow us to directly synthesize speech from a target sound using an analog vocal tract. By combining these techniques with the speech production and analysis components in feedback, we developed a speech processing apparatus that functions as speech-locked loop (SLL). These techniques together with our speech apparatus find applications to speech synthesis, speech recognition, speech coding, speech compression, speaker identification, language identification, voice identification, text to speech, speech restoration, noise reduction and speech prosthetics.

The concept of SLL is not limited to operating within the audio frequency range and may be extended to processing signals at frequency ranges (e.g., radio frequency) outside the audio range. In this case, the input signal is translated to the proper frequency, and the SLL is operated at the appropriate frequency. The SLL may also be configured to process arbitrary sound signals for signal transmission. In this case, SG is an arbitrary sound generator not limited to producing natural speech signals.

The speech production component is a representation of the vocal tract described herein. It is modeled using a non-uniform acoustic tube, with time-varying cross-sectional areas, that is terminated by the vocal cords at one end, and the lips and/or nose at the other. If the cross sectional dimensions of the tube are small compared to the wavelength of sound, the waves that propagate along the tube are approximately planar. The acoustic properties of such a tube are indistinguishable from that of a tube with a circular cross section. The wave equation for planar sound propagation (one dimensional) in a lossless uniform tube of circular cross section can be derived as:

$$-\frac{\partial P}{\partial x} = \frac{\rho}{A}\frac{\partial U}{\partial t} \quad (1)$$

$$-\frac{\partial U}{\partial x} = \frac{A}{\rho c^2}\frac{\partial P}{\partial t}$$

where P is the pressure, U is the volume velocity, ρ is the density of the medium, c the velocity of sound in the medium and A is the area of cross section. The volume of air in a tube exhibits an acoustic inertance ρ/A due to its mass which opposes acceleration and an acoustic compliance $A/\rho c^2$ due to its compressibility. Note that acoustic wave propagation in a tube is analogous to plane-wave propagation along an electrical transmission line where voltage and current are analogous to pressure and volume velocity. The voltage V and current I for a lossless transmission line can be described by the following coupled partial differential equations:

$$-\frac{\partial V}{\partial x} = L\frac{\partial I}{\partial t} \quad (2)$$

$$-\frac{\partial I}{\partial x} = C\frac{\partial V}{\partial t}$$

where L and C are the inductance and capacitance per unit length.

The vocal tract is approximately 17 cm in length for an average man, which is comparable to the wavelength of sound in air at audible frequencies. Hence, a lumped approximation of the major vocal tract components does not provide an accurate analysis. However, the tube may be discretized in space and the entire tube represented in terms of a concatenation of incremental cylindrical sections. The error introduced by area quantization may be kept small if the length, l, of the approximating cylindrical sections are kept short compared to the wavelength of sound corresponding to the maximum frequency of interest.

Figure 3:
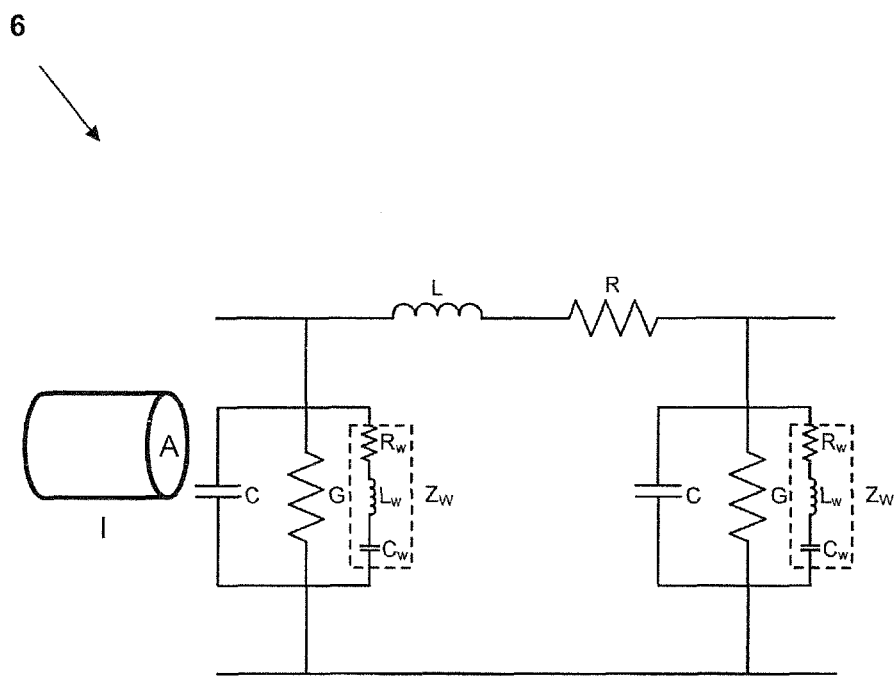
FIG. 3 is an equivalent $\pi$-circuit model of a cylindrical section of acoustic tube with cross sectional area A.

The electrical analog of a section of a lossy acoustic tube with uniform circular cross sectional area A is depicted in FIG. 3. The electrical analog of a section of a lossy acoustic tube with uniform circular cross sectional area A is a standard π section. Assuming that the flow is laminar, R and G models the energy losses due to viscous friction and heat conduction at the walls respectively. In addition to conductance G, the walls of the vocal tract also have stiffness, mass and damping. These mechanical properties of the vocal tract walls influence sound production and can be modeled as an impedance $Z_W$ in parallel to G, where $Z_W$ are approximated by a compliances $C_W$, a mass $M_W$ and a resistance $R_W$ connected in series. At low frequencies (100-200 Hz), $C_W$, $M_W$ and $R_W$, can be assumed to be constant.

Figure 4:
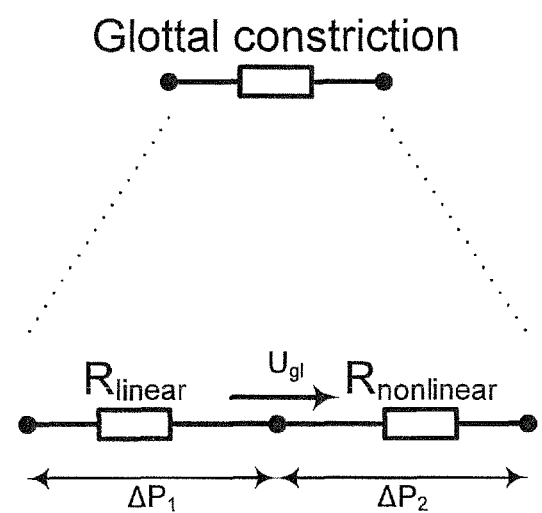
FIG. 4 shows circuit diagram model of a glottal constriction as a series of linear and nonlinear resistors.

The model of a glottal constriction employs a linear resistance $R_{linear}$ in series with a nonlinear resistance $R_{nonlinear}$ as shown in FIG. 4. The linear resistance $R_{linear}$ dominates during laminar flow where the volume velocity (or analogously current) $U_{gl}$ is linearly related to pressure drop (or analogously voltage drop) $\Delta P_1$:

$$\Delta P_1 = \frac{8\pi\mu l_{gl}}{A_{gl}^2} U_{gl} \quad (3)$$

In the nonlinear resistance $R_{nonlinear}$, the current $U_{gl}$ is proportional to the square root of the voltage $\Delta P_2$ across its terminals. In circuit terminology, it has a square-root I-V characteristic:

$$\Delta P_2 = \frac{\rho}{2} \frac{U_{gl}^2}{A_{gl}^2} \qquad (4)$$

An exemplary embodiment of the complete glottis consists of two glottal constrictions connected in series to represent the upper and lower part of the vocal folds. There are two glottal constrictions because the upper and lower folds abduct and adduct with a time lag between them. The opening and closing of the vocal folds are controlled by a glottal oscillator.

Figure 5:
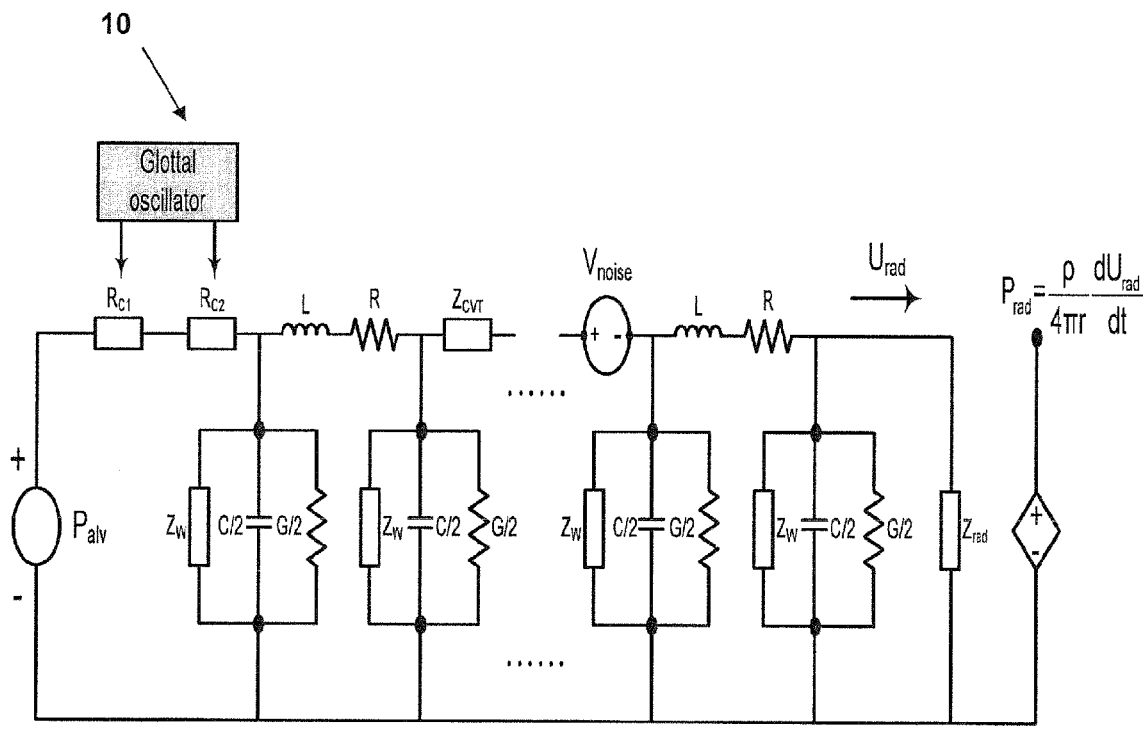
FIG. 5 is a circuit model of a supraglottal vocal tract with one constriction.

In FIG. 5, a constriction in the supraglottal vocal tract is modeled by a constriction impedance $Z_{CVT}$ and a turbulent noise voltage source $V_{noise}$. The noise source is placed 1 cm downstream (corresponding to two π-sections) of the constriction as illustrated in the figure. For simplicity, the nasal tract has been omitted in the illustration. In an embodiment without explicit constriction impedance, $Z_{CVT}$ is formed by constricting the appropriate section of the vocal tract through the cross-sectional area. In an embodiment without an explicit noise voltage source $V_{noise}$, the turbulent air flow can be alternatively generated by appropriately varying the cross-sectional areas.

Another major component of the SLL is the speech analysis component, which is an apparatus that analyses speech/noise signals and extracts salient characteristics of the signals. A particular embodiment of the component is a frequency analysis system such as a perceptually shaped filter bank or cochlea-like apparatus. Other components of the SLL may also be implemented using custom analog or digital VLSI, general purpose DSP or computer.

Figure 6:
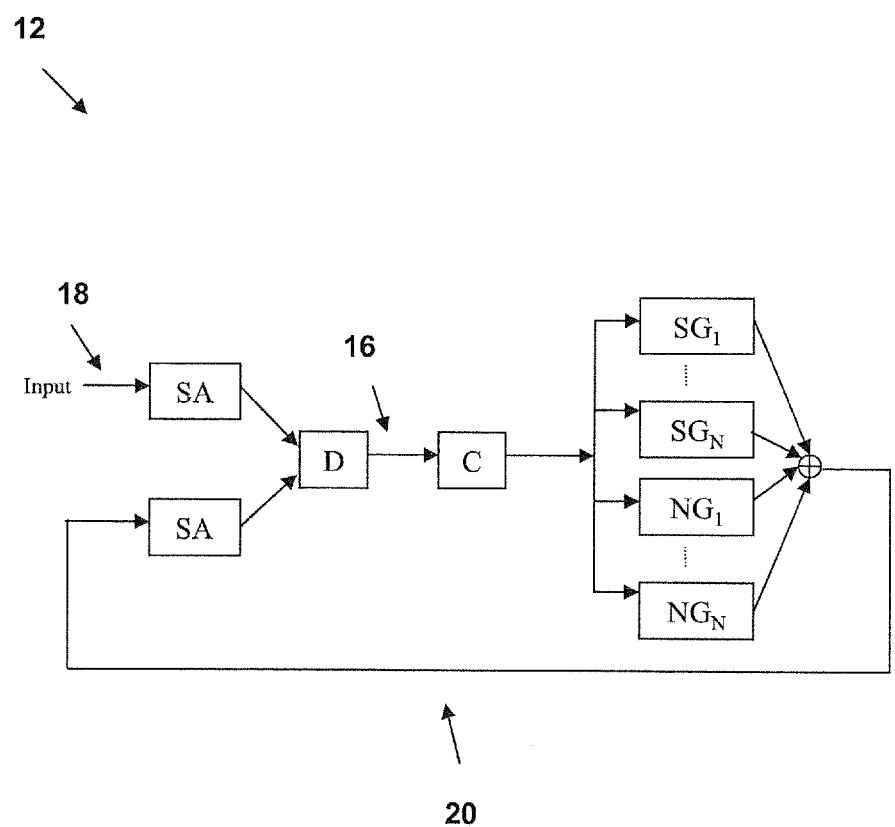
FIG. 6 is a schematic block diagram illustrating the concept of the present invention.

FIG. 6 is a schematic block diagram illustrating the concept of the speech-locked loop (SLL) 12. It comprises a multitude of speech generators (SG) and noise generators (NG), two signal analyzers (SA) that extract salient signal attributes, a difference module to compute the differences in signal attributes (D), and a control module (C) to control SGs using the output of D in a feedback loop.

Figure 7:
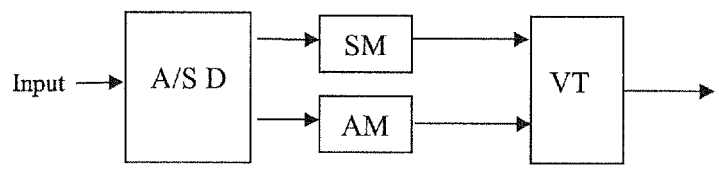
FIG. 7 is a schematic block diagram illustrating a particular embodiment of the speech generator (SG) used in accordance with the invention.

SG is an apparatus that produces speech like signals. It has a set of control parameters (driven by C) that shape its output. FIG. 7 shows a particular embodiment of SG 14 which is composed of a vocal tract (VT), a subglottal model (SM), an articulatory model (AM), and an articulatory/subglottal driver (A/S D). VT can include a nonlinear resistor to model the behavior of the glottis.

NG is an apparatus that produces non-speech (noise) signals. It has a set of control parameters (driven by C) that shape its output. An example of NG is a model of vehicle noise. A pre-recorded or real-time feed of the desired signal and/or noise can be included as additional SGs and/or NGs.

SA is an apparatus that analyses speech/noise signals and extracts salient characteristics of the signals. An example of SA is a frequency analysis system such as a perceptually shaped filter bank or cochlea-like apparatus. The extracted characteristics of the input signal and feedback signal are compared by D to produce an error signal. An example of D is an apparatus which computes L2-norm.

The output 16 of D is processed by the control module (C) to generate a control signal which drives SGs and NGs such that the error signal is eventually minimized through feedback action. In this way the output signal 20 is locked to the input signal 18. In the speech locked condition the parameters characterizing SGs and NGs are the optimal description of the input sound.

The SLL can be operated at frequency range higher than audio range (e.g., radio frequency). The input signal 18 is mixed to the radio frequency, and SGs, SA, and NGs are also mixed to the appropriate frequency. Such an operation shortens the time required for the loop to lock.

Figure 8:
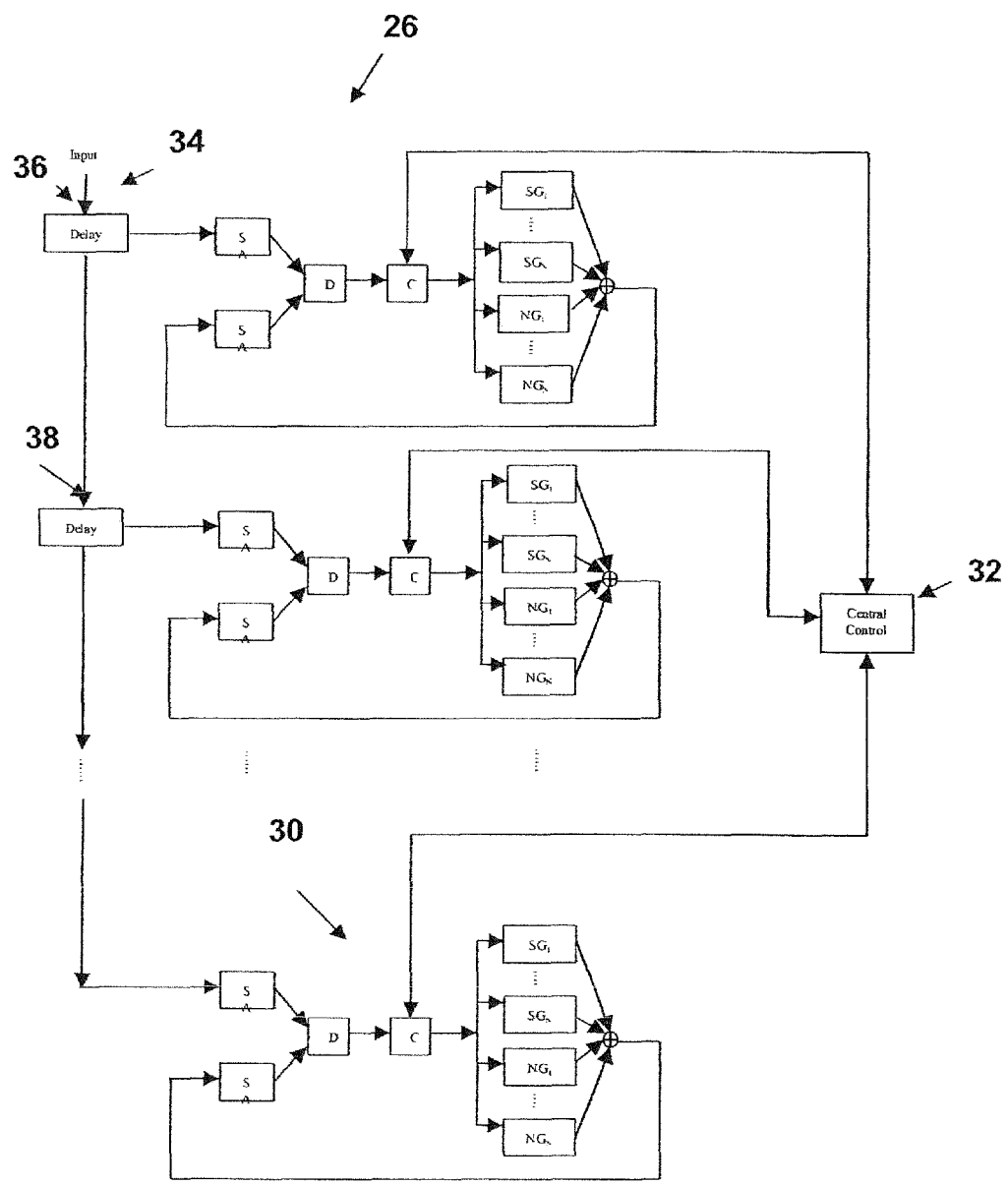
FIG. 8 is a schematic block diagram illustrating the concept of the present invention in the most general case where a collection of apparatus is used.

Multiple SLLs 26, 28, 30 functioning in parallel can be used to process the input, as shown in FIG. 8. In this case, the input signal 34 can be shared or propagated through a delay line 36. In such a parallel structure, control modules (Cs) are influenced by one another through a distributed network of interconnections or a central controller 32 that force the parameters to behave in a desired manner. In a particular embodiment the proposed apparatus can have Cs that use an acoustical distance (AD) between the generated sound and the input, and a value related to the control parameter dynamics (PD) for every SG and NG. The collective behavior of Cs can try to minimize a nonlinear combination of the ADs and PDs. For example, larger AD values reduce the overall AD effect (e.g. $f(AD)=1-e^{-\delta \ AD^2}+\gamma|A/D|$). In estimated high-noise conditions, AD contributions are reduced in favor of PD contributions that rely more on dynamic/articulatory constraints than on acoustic similarities. PD changes according to a priori knowledge and an estimation of the input. (vowel→consonant, stops, grammar, etc).

Different strategies may be used to set the initial condition of control modules (Cs). For example they could be learned a priori in a way that guarantees minimum error. This can be done by trying all the possible initial conditions and input signals, and finding the minimal set of initial conditions that will guarantee convergence to the global minimum by the feedback loop. As arrival at global minimum is assured, a fully parallel architecture with multiple feedback loops starting from the minimum set may be useful to speed up the convergence process. Otherwise, one or multiple initial conditions of the minimum set are processed serially.

In order to generate an optimal control signal which drives SGs and NGs such that the error signal is eventually minimized through feedback action, a perturbation-method-based model (or other models that correlate the error signal to the control parameters) can be employed. In such an embodiment, the SAs may be MEL-filter banks whose outputs are subtracted to produce a vector representing the spectral error. The spectral error vector is used with perturbation methods to vary the control parameters in the feedback loop.

Figure 9:
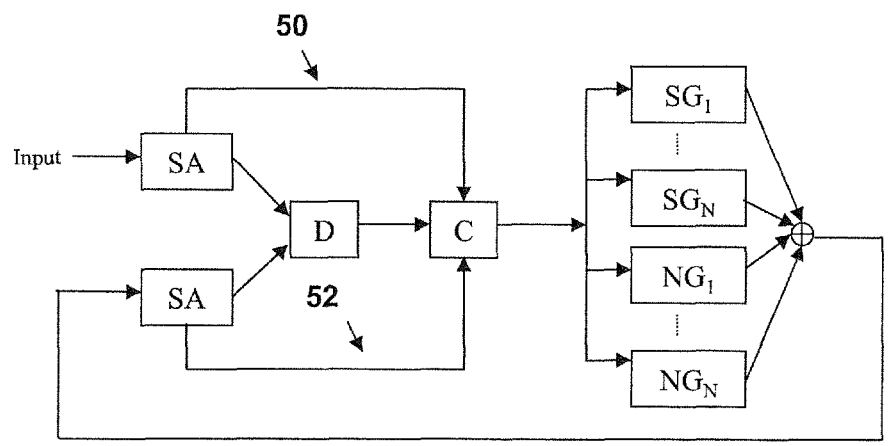
FIG. 9 is a schematic diagram of a particular embodiment illustrating the concept of the present invention.

The SLL may contain feedforward paths 50, 52 from SAs to C, as shown in FIG. 9, that bypass D. For example, signal attributes such as loudness can be directly utilized, without comparison performed by D, by C to exclude the effect of inputs that are not meaningful.

For the purpose of producing turbulent air flow, VT cross-sectional areas may be appropriately perturbed with colored noise. Alternatively, turbulent air flow may be produced by a noise generator appropriately inserted in the vocal tract. In this way, it is not necessary to insert an explicit turbulent noise source in series with the transmission line at the location of the constriction.

The SLL may be used in conjunction with an automatic speech recognition apparatus to improve recognition performance. The SLL error signal and other SLL-locked parameters may be used to this end. The SLL may also be used for the purpose of generating realistic training sequences for an automatic speech recognition apparatus.

A good feature extraction apparatus must be insensitive to features that are not relevant to the goal. For example, MEL-cepstral coefficients (MCC) are the preferred choice for automatic speech recognition because they are relatively insensitive to speech properties that are less relevant to the identification of a phoneme (e.g., formant amplitude and bandwidth, channel properties). The SLL can be used to produce a set of control parameters that is characteristic of the input signal and can be used to replace features like MCC. For example, when the SLL is locked, a good model of the input is attained. In this state, parameters that are not important to speech recognition (e.g., vocal tract length, losses, etc) are decoupled from those that are (e.g., VT areas, velum position) through the use of the SLL. In this paradigm, SA does not have to be insensitive to irrelevant speech recognition features (FFT or time-domain matching could be used instead of MCC). The concept can be extended to focusing on different sets of SA features from time to time.

The locking process can be achieved in different phases where each phase attempts to lock on a different feature provided by the SA. For example, in one phase, the SLL attempts to lock onto the unvoiced features of the input by suppressing the voiced control parameter and employing noise to generate a whispered feedback signal for comparison with the unvoiced input features. The use of broadband noise has the advantage of speeding up the locking process because it enables continuous excitation of all system modes. The lock can also be attempted only in a defined frequency range. In another phase, the loop attempts to lock on the voiced features of the input. The concept can be extended to locking on speaker specific features of the input, e.g., VT features (length, loss, nasal coupling), subglottal features (coupling, resonances). Language and contextual specific features can also be locked.

It is common that the input signal is recorded using a microphone. The source waveform can be altered by the microphone, motion and other disturbances. To remove the effect of the channel path, the SA at the input can pre-compensate for the channel behavior. Additionally, the SA in the loop can be made to compensate for the input channel behavior. This is important for signal restoration purposes e.g. to restore the high frequency components of speech in telephone communications. Each SG and NG can also contain a model of the channel path, controlled by C, connecting each source and the input of the SLL. Such an apparatus is useful to track movement of the source.

The concept of SLL can be easily extended to multiple feedback loops corresponding too many inputs (e.g., stereo recording). In this embodiment, the set of SGs and NGs in each loop contains a model of the channel path connecting the respective source and the input of the SLL. A main controller can be employed to minimize the difference, taking into account the signal quality, between the multiple sets of control parameters. For example, in stereo recording, corresponding SGs and NGs in the two SLLs should be driven by equivalent control signals with different channel parameters for the channel models.

Figure 10:
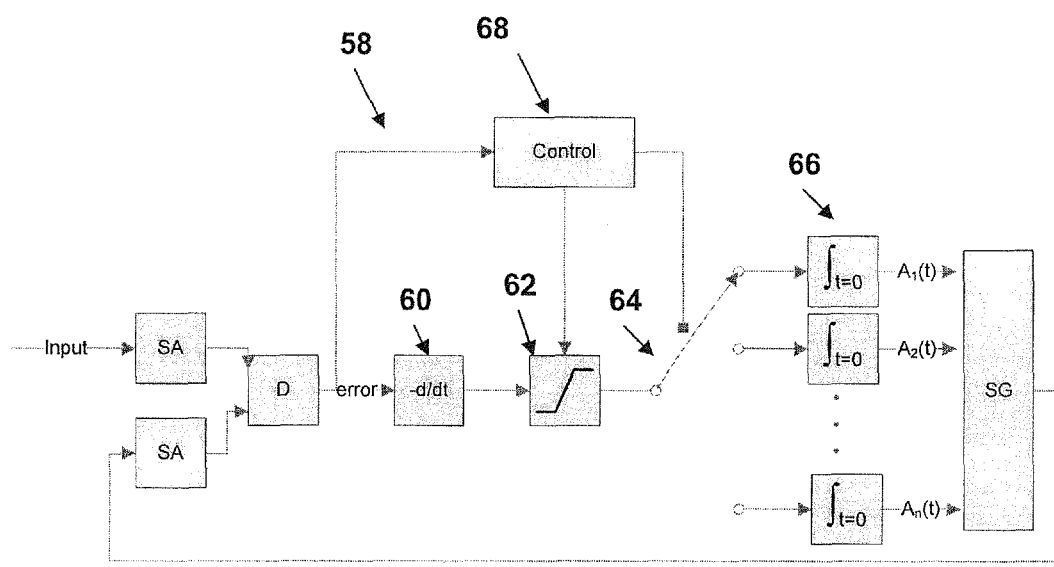
FIG. 10 is a schematic diagram particular embodiment of SLL.

A particular embodiment 58 of control module C may contain a weighted time derivative 60 of the error, a non-linear gain function 62, a weighted time integral with initial conditions for each control parameter 66, a time multiplexer 64, and a controller 68 as illustrated in FIG. 10. Strong weighting of time derivative 60 in C will emphasize the importance of locking to transients in speech, strong weighting of integrals 66 in C will emphasize locking to smooth features in speech. The saturated gain function 62 has a large slope (gain) when the error is large and a smaller slope when the error is small.

Figure 11:
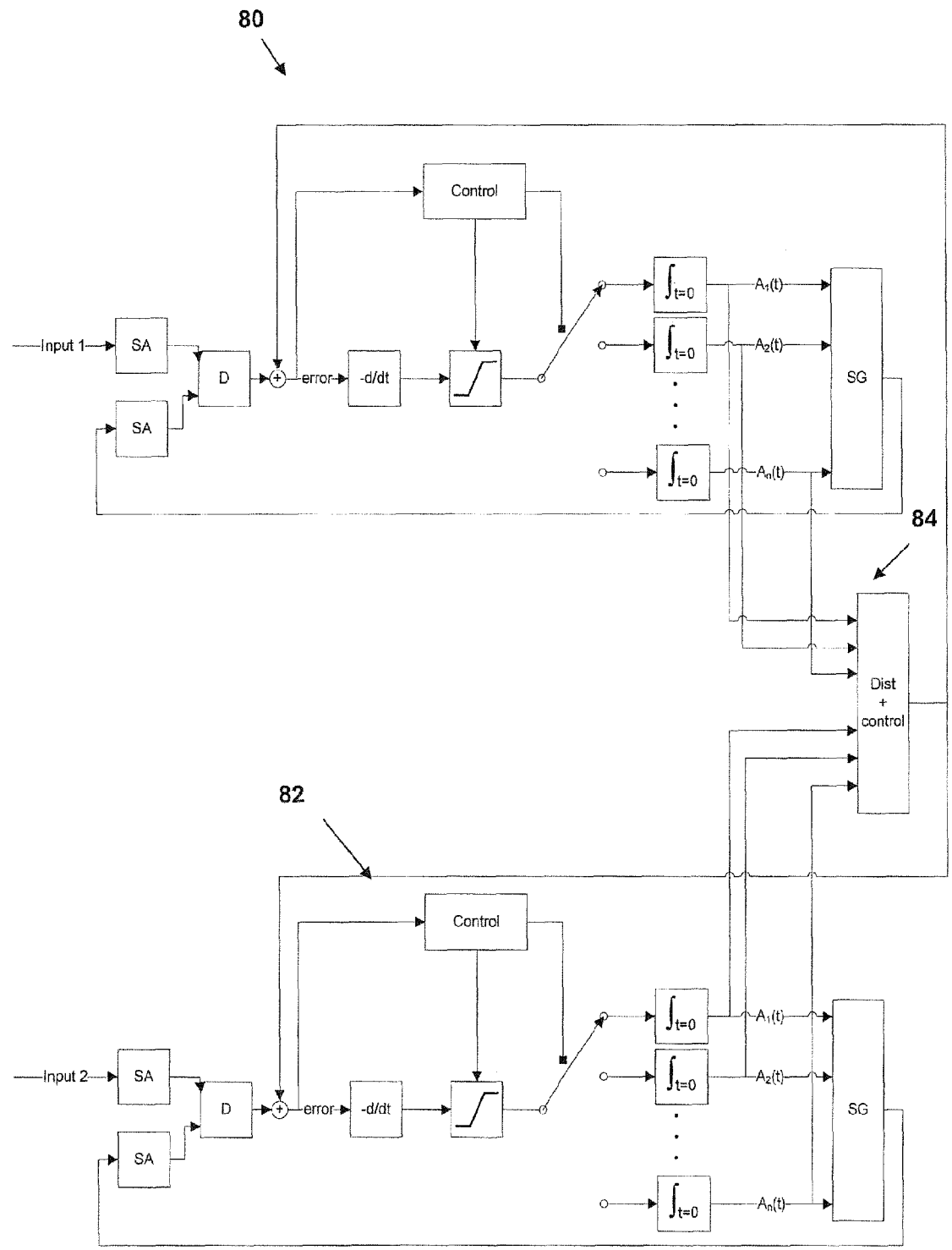
FIG. 11 is a schematic diagram illustrating a particular embodiment of the multi-input SLL.

FIG. 11 depicts a multitude of such apparatus 80, 82 connected by a distribution and control module 84 that extracts control parameter dynamics, based on measures of the control parameters obtained from different loops, to form a multi-input SLL.

Figure 12:
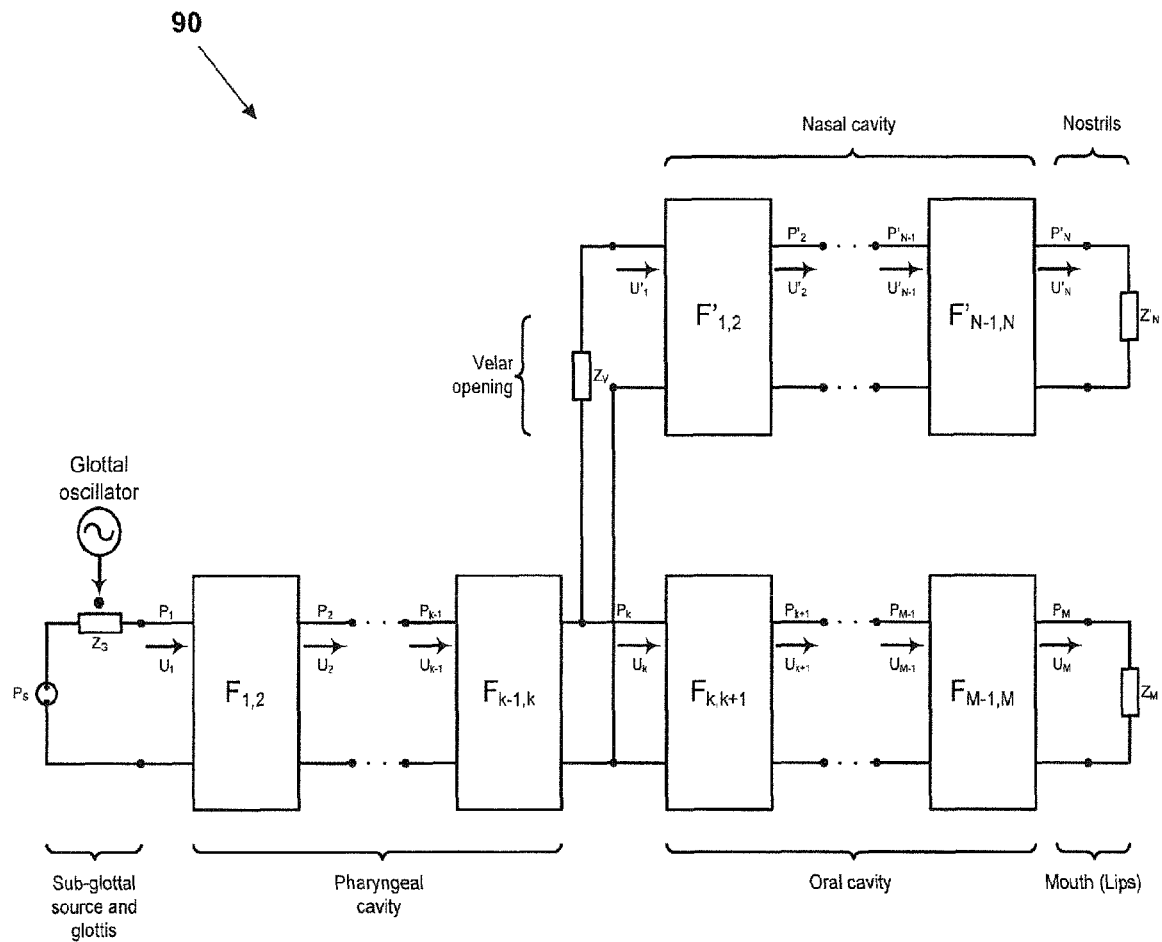
FIG. 12 is a schematic diagram showing a particular embodiment of the speech production component.

FIG. 12 is a schematic diagram showing a particular embodiment of the speech production system 90. Each rectangular box F, F' is a two port representation of an electrical π-section. The boxes, denoted by F, correspond to sections of the main vocal tract, comprising the pharyngeal cavity, subglottal source and glottis, oral cavity, and mouth (lips). The nasal tract is comprised of a cascade of π-sections denoted by F' that includes the nasal cavity and nostrils. The nasal cavity is coupled to the vocal tract through velar impedance $Z_V$. The subglottal source is represented by a voltage source $P_s$. The glottis is represented by a tunable impedance $Z_G$. The glottal impedance $Z_G$ is controlled by a glottal oscillator which modulates the value of $Z_G$.

Figure 13:
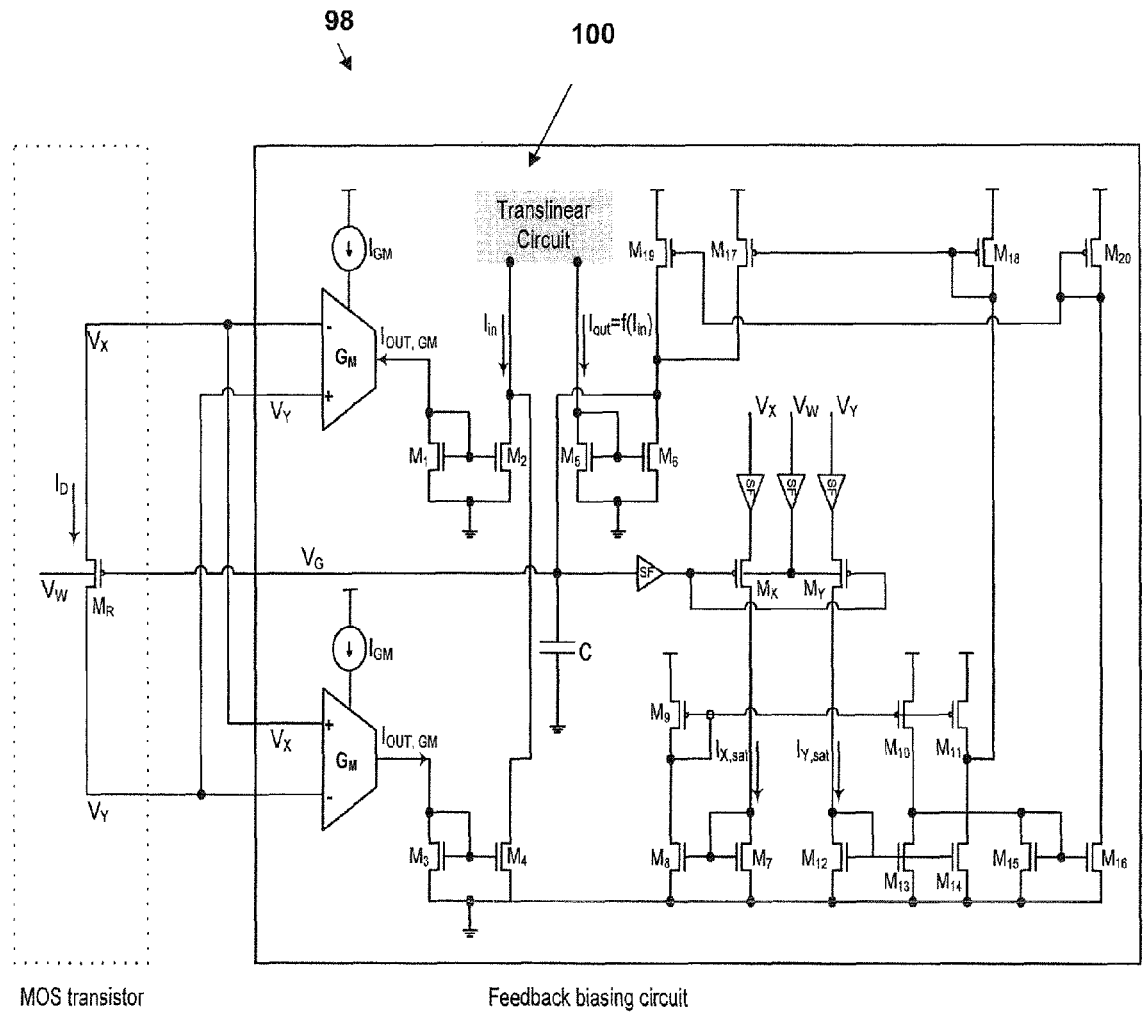
FIG. 13 is a schematic diagram particular circuit embodiment of the glottal resistor.

FIG. 13 shows a circuit 98 for the glottal impedance $Z_G$. In this and subsequent circuit diagrams, the bulk connections of NMOS and PMOS devices are connected to $V_{SS}$ (ground) and $V_{DD}$ respectively, except where indicated. The potential difference $V_X - V_Y$ across the main MOS device $M_R$ is sensed and converted into a current $I_{OUT,GM}$ using a wide linear range operational transconductance amplifier (WLR OTA) such as that described in $I_{OUT,GM}$ is linearly related to the sensed input voltages as follows:

$$I_{OUT,GM} = G_M(V_X - V_Y) \qquad (5)$$
$$= G_M V_{XY}$$

The proportionality constant $G_M$, the transconductance of the WLR OTA, is given by:

$$G_M = \frac{I_{GM}}{V_L} \qquad (6)$$

where $I_{GM}$ and $V_L$ are the biasing current and input linear range of the WLR OTA respectively. Hence, $G_M$ is electronically tunable via $I_{GM}$. In FIG. 13, the two WLR OTAs in conjunction with diode connected transistors $M_1$ and $M_3$ produce two half-wave rectified currents that are proportional to $|V_{XY}|$ across the source-drain terminals of $M_R$ with each current being non-zero if and only if $V_{XY} > 0$ or $V_{XY} < 0$ respectively. The rectified output currents are mirrored via $M_2$ or $M_4$ to create a full wave rectified current $I_{in}$.

Figures 14A, 14B, 14C:
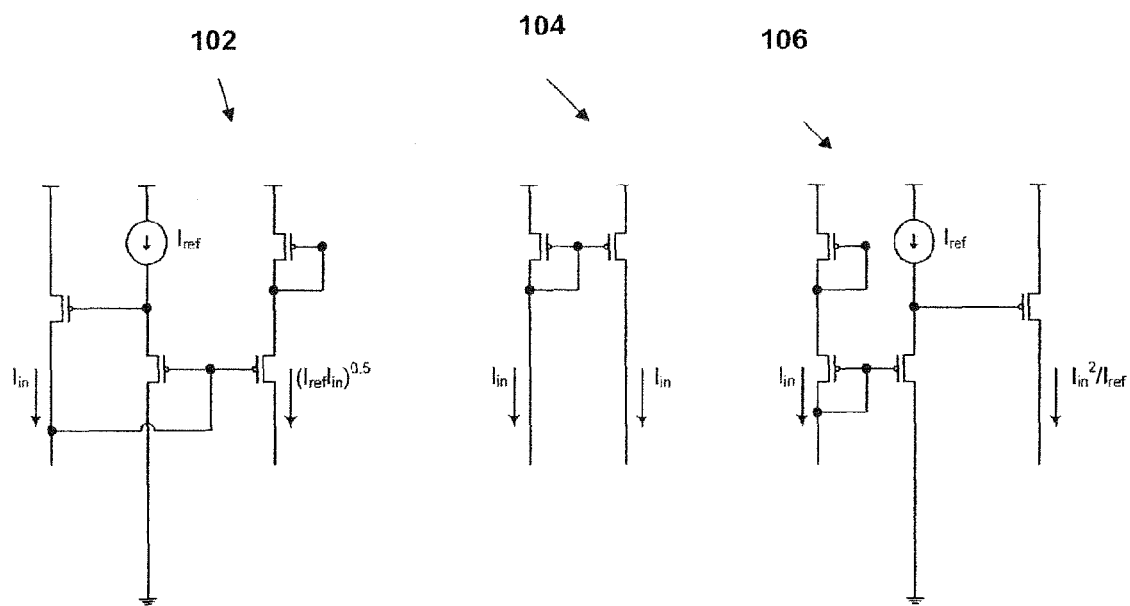
FIGS. 14A-14C are circuit diagrams showing examples of translinear circuits used in FIG. 14.

The translinear circuit 100 produces an output current $I_{out}$ that is a function of $I_{in}$. By using a translinear circuit that implements an appropriate function, the MOS resistor can be configured to have linear or nonlinear I-V characteristics. Translinear circuits 102, 104, 106 which eventually result in compressive, linear and expansive I-V characteristics for the resistor are shown in FIGS. 14A-14C. In particular FIG. 14A shows a particular embodiment that serves to provide a current output that is proportional to the square root of the current input and FIG. 14B shows is a particular embodiment that serves to provide a current output that is proportional to the current input. FIG. 14C shows a particular embodiment that serves to provide a current output that is proportional to the square of the current input. The saturation currents $I_{X,sat}$ and $I_{Y,sat}$ of $M_R$ are proportionally replicated by sensing $V_G$, $V_W$, $V_X$ and $V_Y$ on the gate, well, source and drain terminals of $M_R$ with source followers and applying $V_{GX}$ and $V_{GY}$ across the gate-source terminals of transistors $M_X$ and $M_Y$. The source followers marked SF in FIG. 14 serve as buffers to prevent loading on $M_R$. Transistors $M_7$-$M_{14}$ serve to compute $I_{X,sat} - I_{Y,sat}$ or $I_{Y,sat} - I_{X,sat}$ and transistors $M_{15}$-$M_{20}$ compare $|I_{X,sat} - I_{Y,sat}|$ with a mirrored version of the translinear output current $I_{out} = f(I_{in})$. Any difference between these two currents will cause the capacitor C to charge or discharge such that the gate bias voltage $V_G$ equilibrates at a point where the two are nearly equal via negative feedback action.

Figure 15A:
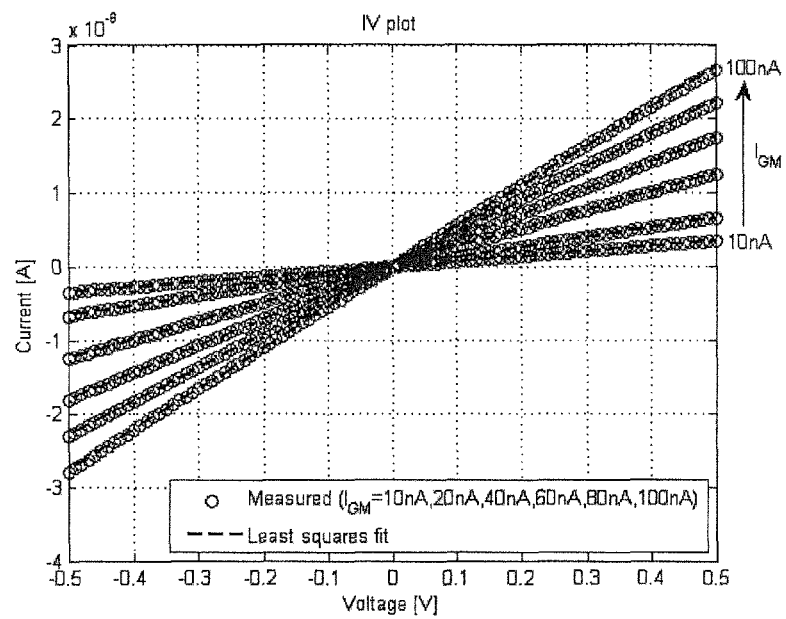
FIGS. 15A-15B are graphs illustrating measured I-V characteristics of linear and nonlinear resistances used in a model of the glottis.
Figure 15B:
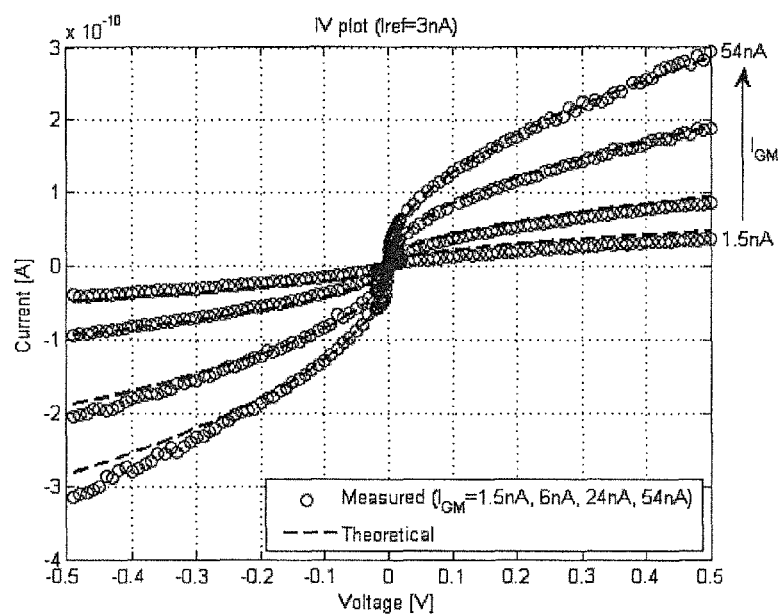

FIGS. 15A-15B show measured I-V characteristics of a VLSI implementation of the electronically tunable linear and nonlinear resistances used our model of the glottis. FIG. 15A shows the measured I-V characteristics of the linear resistor for various values of biasing current $I_{GM}$. The slope of the I-V characteristic i.e. the conductance is determined electronically by $I_{GM}$. FIG. 15B shows the measured I-V data for the nonlinear resistor having an I-V relation given by:

$$I_D = \sqrt{I_{ref} G_M V_{XY}} \qquad (7)$$

The nonlinear resistor uses the translinear circuit depicted in FIG. 14A. The theoretical I-V curve is also plotted in dashed lines for comparison. The plots also show that the I-V relation can be scaled electronically by varying the biasing current $I_{GM}$ of the OTA.

Figure 16:
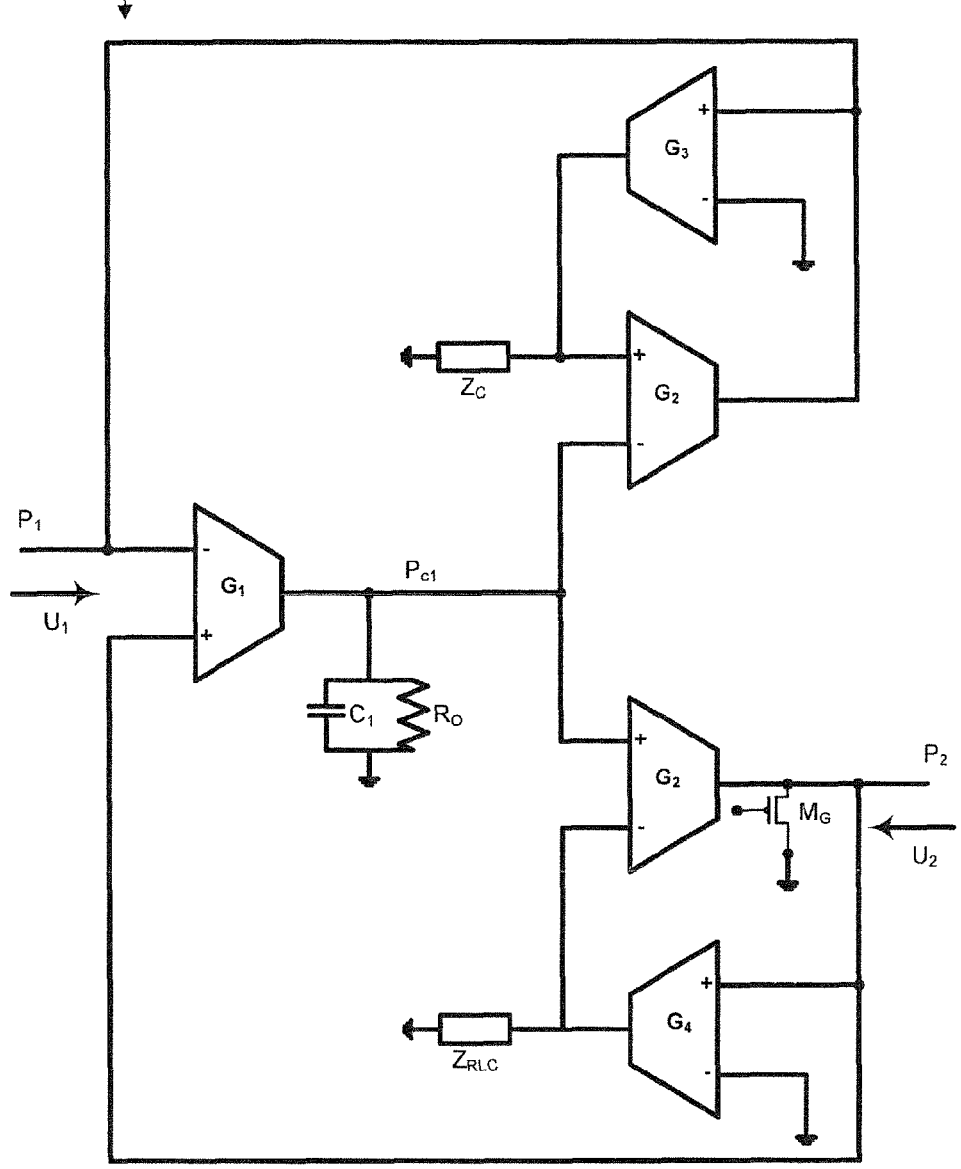
FIG. 16 is circuit diagram illustrating a particular circuit embodiment of a $\pi$-section used in accordance with the invention.

FIG. 16 shows a particular circuit 112 for the electrical r-section. $G_1$, $G_2$ $G_3$ and $G_4$ are transconductors whose tranconductances can be controlled by independent biasing currents. $R_O$ is the output impedance of $G_1$. $C_1$ is a capacitance. $G_1$, $G_2$, $C_1$ and $R_O$ implement the inductor L and series resistor R of the π-section. $G_2$, $G_3$ and $Z_C$ implement the shunt capacitance C. $Z_C$ is a circuit element or network that implements an inductor. The MOS device $M_G$ implements the shunt conductance G. $M_G$ can be replaced by a circuit element or network that implements a controlled resistance. The wall impedance $Z_W$ is implemented by $G_2$, $G_4$ and $Z_{RLC}$. $Z_{RLC}$ is a circuit element or network that implants a conductance, inductance and capacitance connected in parallel. The biasing currents of $G_1$ and $G_2$, together with the capacitance $C_1$ determine the value of L. The value of the output resistance $R_O$ determines R. The biasing currents of $G_2$ and $G_3$, together with the control parameters of $Z_C$ determine the shunt capacitance C. The biasing currents of $G_2$ and $G_4$, together with the control parameters of $Z_{RLC}$ determine the wall impedance $Z_W$. The circuit topology implements changes in cross-sectional area of each π-section through the biasing current of $G_2$. Hence, only one bias current is varied to emulate cross-sectional area variations in each section of the vocal tract.

Figure 17:
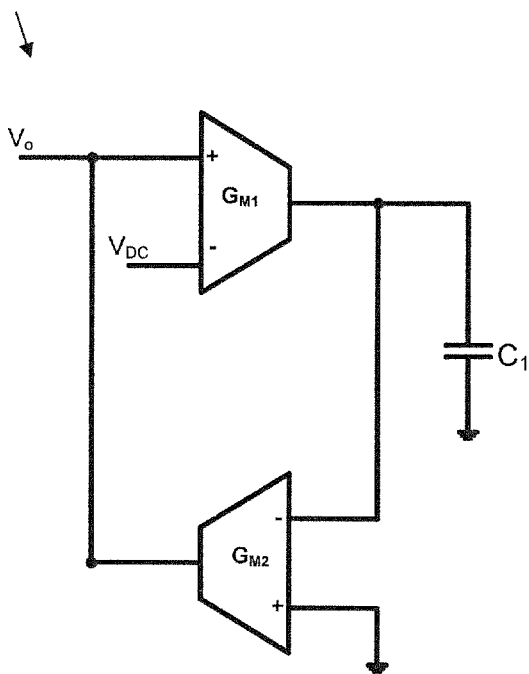
FIG. 17 is a circuit diagram illustrating a particular circuit model of impedance $Z_C$ in FIG. 16.
Figure 18:
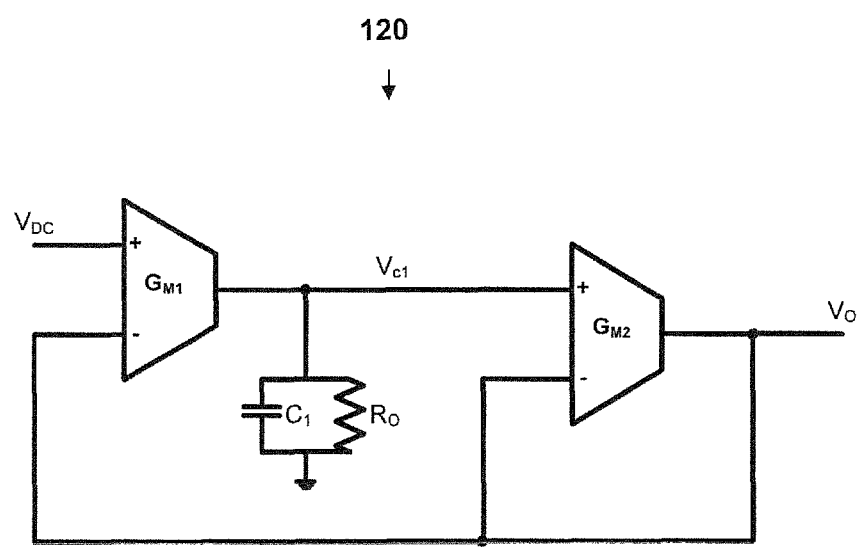
FIG. 18 is a circuit diagram illustrating another particular circuit model of impedance $Z_C$ in FIG. 16.
Figure 19:
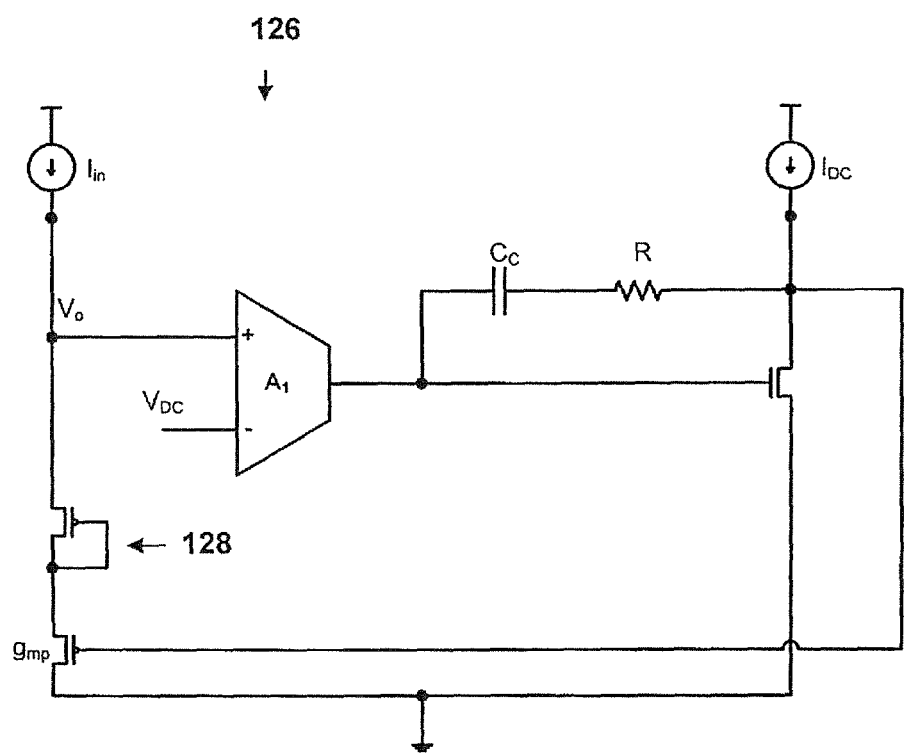
FIG. 19 is a circuit diagram illustrating a particular circuit model of impedance $Z_C$ in FIG. 16.
Figure 20A:
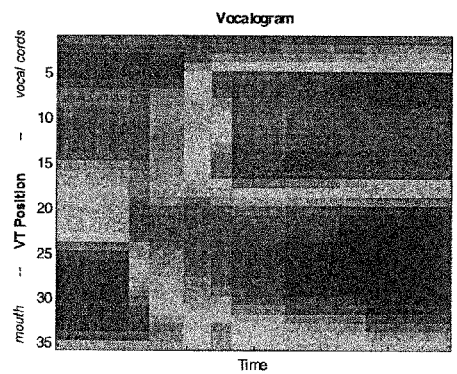
FIGS. 20A-20B are a vocalogram and articulogram of diphthong /a$^y$/ generated by a SLL.
Figure 20B:
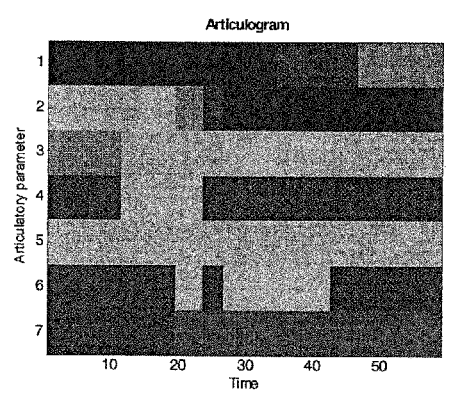
Figure 21A:
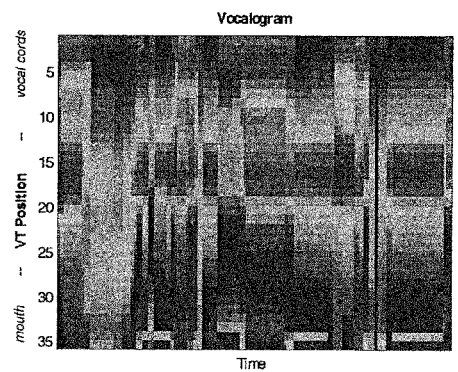
FIGS. 21A-21B are a vocalogram and articulogram of word "Massachusetts" generated by a SLL.
Figure 21B:
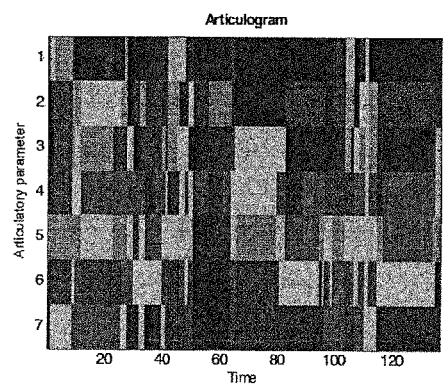

FIG. 17 and FIG. 18 show circuits 118, 120 used in modeling the impedance $Z_C$. They comprise two transconductors $G_{M1}$ and $G_{M2}$ which gyrates a capacitance $C_1$ such that the impedance at $V_O$ behaves like an equivalent inductor whose inductance is given by $C_1/G_{M1}G_{M2}$. FIG. 19 show a circuit 126 that uses that uses an amplifier $A_1$ and a transconductor $g_{mp}$ connected in a feedback loop. The compensation capacitor $C_C$ is gyrated to produce an equivalent inductance at $V_O$ using current source $I_{in}$ and $I_{DC}$. The source of a MOSFET 128 is connoted to $V_O$ and the gate and drain of MOSFET 128 is connected to the transconductor $g_{mp}$. The described embodiments for impedance $Z_C$ can be connected in parallel with a capacitance and a conductance to implement $Z_{RLC}$.

FIGS. 20A-20B and FIGS. 21A-21B show examples of articulograms, illustrating the articulatory trajectories, and vocalograms, illustrating the vocal tract area trajectories, obtained from a particular embodiment of the multi-input SLL shown in FIG. 11. In this example, SAs are implemented as MEL filter banks, D computes a L2 norm, and SG is a VLSI vocal tract, as described in FIG. 11 through FIG. 19, and including an articulatory model. Each input of the multi-input SLL processes a different time segment of 20 ms duration with 50% overlap. Each loop attempts to lock from a set of 250 pre-computed initial conditions. Twenty sets of control (articulatory) parameters with the best acoustic match (with their respective acoustic errors) from each SLL are used by the "Dist+Control" block in a dynamic programming fashion to produce an optimal articulatory trajectory (articulogram) that minimizes the overall error computed by the multi-input SLL and comprising acoustic errors and articulatory costs. The corresponding vocalogram is used to drive the vocal tract to produce speech waveforms.

Figure 22A:
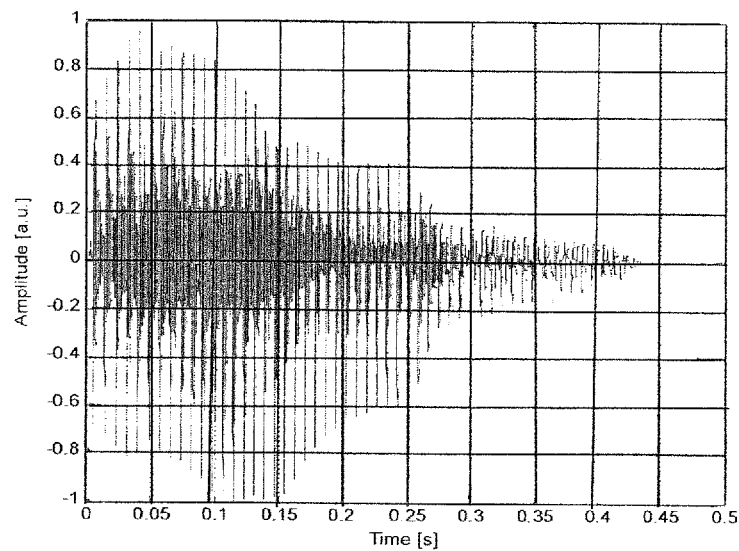
FIGS. 22A-22B are a waveform and a spectrogram of diphthong /aʸ/ generated by speech production component.
Figure 22B:
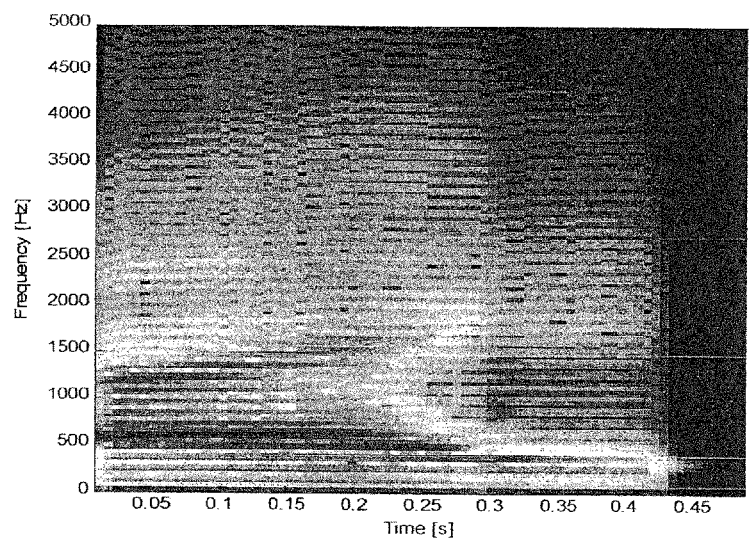
Figure 23A:
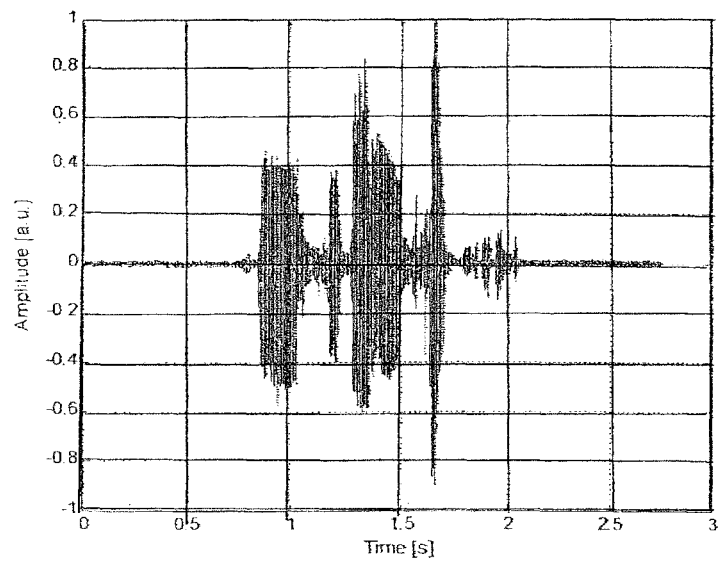
FIGS. 23A-23B are a waveform and spectrogram of word "Massachusetts" generated by speech production component.
Figure 23B:
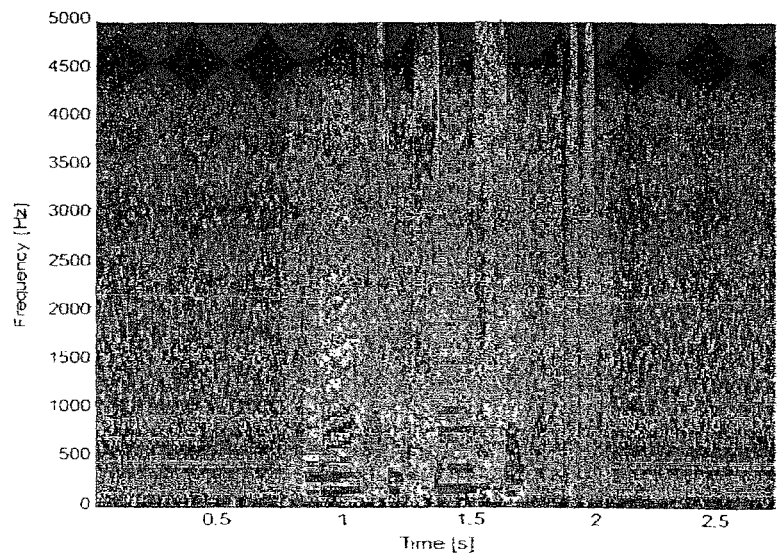

FIGS. 22A-22B and FIGS. 23A-23B show examples of measured speech waveforms and their spectrograms obtained from the VLSI vocal tract. In particular, FIGS. 22A-22B show the diphthong /a$^y$/ and FIGS. 23A-23B show the word "Massachusetts" generated by the vocal tract SG that is driven by time varying cross-sectional areas (vocalogram) and glottal source acting as control parameters.

The invention can extract sequence of articulatory parameters (vocalogram), sequences of subglottal parameters and sequences of noise parameters for an improved speech synthesis system, speech recognition system, speech coding system, speech compression system, speaker identification system, language identification system, voice identification system, text to speech system, speech restoration system, noise reduction system or a speech prosthetic system.

Although the present invention has been shown and described with respect to several preferred embodiments thereof, various changes, omissions and additions to the form and detail thereof, may be made therein, without departing from the spirit and scope of the invention.

What is claimed is:

1. A speech processing system comprising:
    a plurality of signal analyzers that extract salient signal attributes of an input voice signal;
    a difference module for computing the differences in signal attributes; and
    one or more control modules for controlling a plurality of speech generators using an output signal from said difference module in a speech-locked loop (SLL), said speech generators use the output signal to generate a voice signal, said speech-locked loop locks onto unvoiced input features of said input voice signal by suppressing a voiced control parameter and employing noise to generate a feedback signal for comparison with said unvoiced input features.

2. The speech processing system of claim 1 further comprising a plurality of noise generators.

3. The speech processing system of claim 2, wherein the control modules use an acoustical distance (AD) between the generated voice signal and the input voice signal, and a value related to control parameter dynamics (PD) for every speech generator and noise generator so that the collective behavior of the control modules minimizes a nonlinear combination of the ADs and PDs.

4. The speech processing system of claim 2, wherein the speech analyzers, speech generators, and noise generators vary with the channel behaviors.

5. The speech processing system of claim 1, wherein the SLL operate outside an audio frequency range.

6. The speech processing system of claim 1, wherein the input signal is translated to a frequency range other than the audio frequency range, and speech generators and speech analyzers also operate at other frequency ranges.

7. The speech processing system of claim 1, wherein said SLL comprises a plurality of feedback loops functioning in parallel.

8. The speech processing system of claim 1, wherein each speech generator comprises a vocal tract (VT), a subglottal model, an articulatory model, and an articulatory/subglottal driver.

9. The speech processing system of claim 8, wherein the vocal tract (VT) includes a nonlinear element to model the behavior at vocal tract constrictions.

10. The speech processing system of claim 8, wherein the vocal tract cross-sectional areas are appropriately perturbed with the purpose of producing turbulent air flow.

11. The speech processing system of claim 1, wherein said control module uses initial conditions predetermined to guarantee an efficient convergence.

12. The speech processing system of claim 1, wherein the one or more control modules comprise a plurality of control modules that are influenced by one another through a distributed network of interconnections that force the parameters to behave in a desired manner.

13. The speech processing system of claim 1, wherein the one or more control modules are influenced by a central control apparatus.

14. The speech processing system of claim 13, wherein the input voice signal is propagated through a delay line.

15. The speech processing system of claim 1, wherein the control modules comprise a model that correlates the error signal to a plurality of control parameters.

16. A method of performing the operations of a speech processing system comprising:
   extracting salient signal attributes of an input voice signal using a plurality of signal analyzers;
   computing the differences in the salient signal attributes using a difference module; and
   controlling a plurality of speech generators using an output signal from said difference module in a speech-locked loop (SLL) using one or more control modules, said speech generators use the output signal to generate a voice signal, said speech-locked loop locks onto unvoiced features of said input voice signal by suppressing a voiced control parameter and employing noise to generate a feedback signal for comparison with said unvoiced input features.

17. The method of claim 16 further comprising generating noise signals using a plurality of noise generators.

18. The method of claim 16, wherein the SLL operate outside an audio frequency range.

19. The method of claim 16, wherein the input signal is translated to a frequency range other than the audio frequency range, and speech generators and speech analyzers also operate at other frequency ranges.

20. The method of claim 16, wherein said SLL comprises a plurality of feedback loops functioning in parallel.

21. The method of claim 16, wherein each speech generator comprises a vocal tract (VT), a subglottal model (SM), an articulatory model (AM), and an articulatory/subglottal driver (A/S D).

22. The method of claim 21, wherein the vocal tract (VT) includes a nonlinear element to model the behavior at vocal tract constrictions.

23. The method of claim 16, wherein said control module uses initial conditions predetermined to guarantee an efficient convergence.

24. The method of claim 16, wherein the one or more control modules comprise a plurality of control modules that are influenced by one another through a distributed network of interconnections that force the parameters to behave in a desired manner.

25. The method of claim 16, wherein the one or more control modules are influenced by a central control apparatus.

26. The method of claim 25, wherein the input voice signal is propagated through a delay line.

27. A method of developing a speech processing system comprising:
   providing a plurality of signal analyzers that extract salient signal attributes of an input voice signal;
   implementing a difference module for computing the differences in said salient signal attributes; and
   implementing one or more control modules for controlling a plurality of speech generators using an output signal from said difference module in a speech-locked loop (SLL), said speech generators use the output signal to generate a voice signal, said speech-locked loop locks onto unvoiced features of said input voice signal by suppressing a voiced control parameter and employing noise to generate a feedback signal for comparison with said unvoiced input features.

28. The method of claim 27 further comprising generating noise signals using a plurality of noise generators.

29. The method of claim 27, wherein the SLL operate outside an audio frequency range.

30. The method of claim 27, wherein the input signal is translated to a frequency range other than the audio frequency range, and speech generators and speech analyzers also operate at other frequency ranges.

31. The method of claim 27, wherein said SLL comprises a plurality of feedback loops functioning in parallel.

32. The method of claim 27, wherein each speech generator comprises a vocal tract (VT), a subglottal model (SM), an articulatory model (AM), and an articulatory/subglottal driver (A/S D).

33. The method of claim 32, wherein the vocal tract (VT) includes a nonlinear element to model the behavior at vocal tract constrictions.

34. The method of claim 27, wherein said control module uses initial conditions predetermined to guarantee an efficient convergence.

35. The method of claim 27, wherein the one or more control modules comprise a plurality of control modules that are influenced by one another through a distributed network of interconnections that force the parameters to behave in a desired manner.

36. The method of claim 27, wherein the one or more control modules are influenced by a central control apparatus.

37. The method of claim 36, wherein the input voice signal is propagated through a delay line.

* * * * *